United States Patent

[11] 3,592,479

| [72] | Inventor | Raymond H. Andresen<br>Barrington, Ill. |
|---|---|---|
| [21] | Appl. No. | 804,498 |
| [22] | Filed | Mar. 5, 1969 |
| [45] | Patented | July 13, 1971 |
| [73] | Assignee | Gits Bros. Mfg. Co.<br>Chicago, Ill. |

[54] SHAFT SEAL
1 Claim, 4 Drawing Figs.

[52] U.S. Cl. ............................................. 277/40, 277/87
[51] Int. Cl. ............................................. F16j 15/40, F16j 15/54
[50] Field of Search ................................. 277/40, 41, 42, 38, 85, 87

[56] References Cited
UNITED STATES PATENTS

| 2,479,968 | 8/1949 | Schick | 277/38 |
| 2,593,899 | 4/1952 | Krug | 277/40 |
| 2,871,039 | 1/1959 | Payne | 277/38 |
| 2,922,668 | 1/1960 | Haake | 277/38 |
| 3,162,452 | 12/1964 | Tankus | 277/38 X |

FOREIGN PATENTS

| 1,279,292 | 11/1961 | France | 277/87 |

Primary Examiner—Samuel Rothberg
Attorney—Hill, Sherman, Meroni, Gross & Simpson ABSTRACT: A shaft seal having a U-shaped cross section ring housing adapted to encircle the shaft, the "U" opening axially, a carbon nose member projecting from the open end and urged axially by a spring force, a J-shaped cross section secondary seal ring having the long leg thereof urged axially against the back side of the nose member within the housing and the bight thereof urged radially against the inner diameter wall of the housing, the secondary seal being positioned so as to be urged into greater sealing contact in dependent response to the pressure contained.

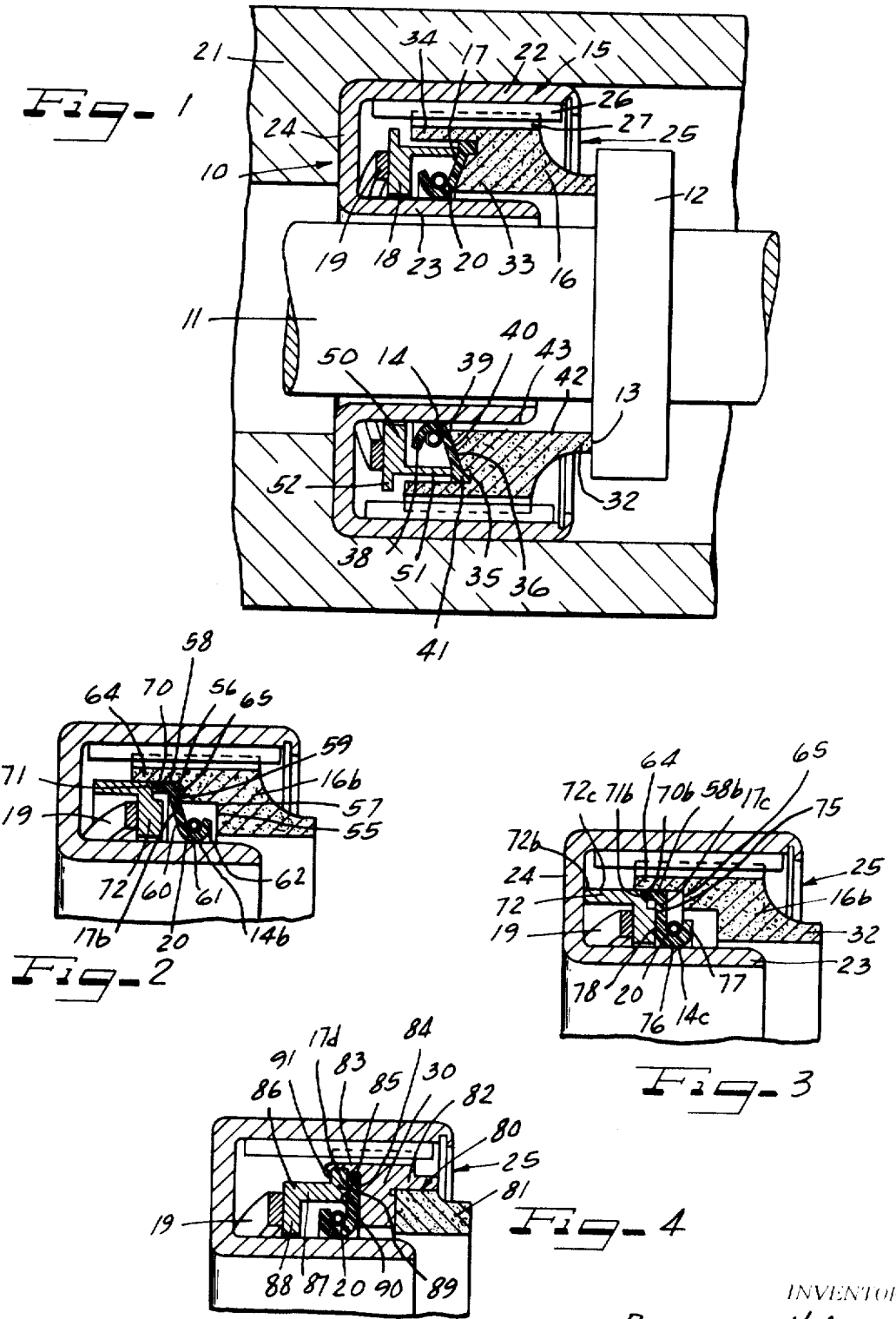

SHAFT SEAL

BACKGROUND OF THE INVENTION

1. Field of the Invention

This invention relates to the sealing art and more particularly to shaft seals.

2. Prior Art

Shaft seals employing primary and secondary seal members are known to the art. In many prior art shaft seals of this type, the secondary seal was provided by an elastomer member. In those instances where the seal is to be used in a high-temperature or corrosive environment, elastomer secondary seals deteriorate rapidly. Further, elastomer seals tend to stick after exposure to hot oils and in such environments elastomer may swell and become less resilient.

In modern seal environments such as aircraft engines, it is necessary for shaft seals to operate in extreme temperature ranges. Such temperature ranges are often excessive for elastomers which may initially have suitable mechanical properties.

The prior art has attempted to overcome this difficulty through the use of materials other than elastomers. One proposed solution has been the use of Teflon (Registered trademark of E. I. du Pont de Nemours & Co. for polytetrafluoroethylene). In prior art Teflon applications, the secondary ring was usually a modified O-ring packing or a wedge packing, both of which require that the packing be placed in a restrictive housing and that the interference fit thus generated create the sliding or moving seal joint.

Because of the hardness of Teflon, such a sliding joint becomes stiff and irregular in its action, thereby creating a situation where a large spring force is required to overcome the friction. This results in loading the rotating seal interface to the extent that rapid wear takes place. A further disadvantage is created by the cold flow characteristics of Teflon which destroys a close tolerance fit when subjected to extreme temperature ranges.

SUMMARY OF THE INVENTION

These deficiencies are overcome by the present construction which provides a primary and secondary shaft seal construction having a U-shaped cross section ring housing adapted to encircle the shaft with the open end ring of the "U" comprising one of the axial ends of the housing. A carbon nose seal ring projects from the open end and is adapted to ride in sealing relation against an increased diameter portion of the shaft. The nose member is prevented from rotating within the housing. A wave spring bottoms on the back wall of the housing and acts against a ferrule urging it axially toward the open end of the housing. The ferrule in turn bears against the long leg of a J-shaped cross section Teflon secondary seal ring urging it against a radial wall of the carbon nose member to urge that member axially. The bight portion of the "J" contacts the inner diameter of the housing providing the secondary seal. The spring force generated by the wave spring is transmitted to the carbon nose member through the secondary seal to urge the nose member into sealing engagement with the increased diameter portion of the shaft.

In order to compensate for the cold flow characteristics of the secondary seal, a garter spring encircles the secondary seal in the bight thereof. The constrictive force of the garter spring continually urges the secondary seal into circumferential sealing contact with the inner diameter wall of the housing irrespective of the temperature ranges encountered by the seal.

In the preferred embodiment, the secondary seal is positioned with the short leg of the "J" shape on the high pressure side, thereby utilizing the contained pressure to increase the sealing contact of the secondary seal.

It is therefore an object of this invention to provide a primary and secondary seal shaft seal utilizing a "J" shaped secondary seal.

It is another object of this invention to provide an improved shaft seal having a "J" shaped cross section secondary seal ring which is continuously urged into circumferential sealing relation with a portion of the seal housing.

It is another object of this invention to provide a shaft seal having a primary seal member sealing in a radial direction and a secondary seal member sealing in an axial direction having portions contacting in sealing relationship portions of both the housing and the primary seal.

It is another object of this invention to provide a shaft seal having a sealing interface between a portion of the seal and an increased diameter portion of the shaft which allows axial movement of the shaft with respect to the seal housing and which has a secondary "J" shaped Teflon seal member contained within the housing and urged into sealing engagement with the inner diameter wall of the housing.

It is yet another and more important object of this invention to provide an axially movable primary and secondary seal shaft seal contained in a U-shaped cross section ring housing having an axially spring-urged primary seal and a radially spring-urged J-shaped secondary seal which is retained in sealing contact with the inner diameter wall of the housing irrespective of environmental temperatures and which is capable of accommodating axial movement.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a cross-sectional view of the shaft seal of this invention received in a shaft housing with a shaft projecting therethrough.

FIG. 2 is a fragmentary cross-sectional view of another embodiment of the seal of this invention which is capable of accommodating pressure reverses.

FIG. 3 is a view similar to FIG. 2, illustrating the seal in a high pressure use.

FIG. 4 is a view similar to FIG. 2, illustrating another embodiment of this invention.

DESCRIPTION OF THE PREFERRED EMBODIMENTS

As illustrated in FIG. 1, the seal assembly 10 of this invention is adapted to be positioned around a shaft 11 and cooperate with an increased-diameter portion 12 thereof to provide a primary seal interface 13. A secondary seal interface 14 is created within the seal assembly itself. The seal assembly consists of a housing 15, a primary seal member 16, a secondary seal member 17, a ferrule 18, a wave spring 19 and a garter spring 20.

The seal housing 15 is designed to be received in a shaft housing 21 and be retained in nonrotatable relationship therewith. The housing 15 is of substantially U-shaped cross section, having an outer diameter wall 22, an inner diameter wall 23 and a backwall 24. The end 25 opposite the backwall 24 is open in an axial direction. As illustrated, in the preferred embodiment, the inner diameter wall 23 is axially shorter than the outer diameter wall 22. The outer diameter wall 22 has, on its inner diameter, radially projecting tongues 26 which interfit with radial grooves 27 in the primary seal member 16 to prevent rotation of the seal components.

The primary seal member 16 may be constructed entirely of carbon as in the embodiment in FIG. 1 or may be constructed partially of carbon and partially of a noncarbon retaining member such as that identified by the numeral 30 in FIG. 4.

The primary seal member 16 has an axial end configuration at one end thereof which projects a seal nose 32 axially out the open end 25 of the housing to a point where it can contact the increased diameter portion 12 of the shaft 11 at the interface 13. As illustrated, the nose 32 is preferably of a radial thickness less than the main portion of the primary seal 16. In the embodiment illustrated in FIG. 1, the axial end 33 opposite the nose 32 is contoured to receive the secondary seal 17. The end 33 has an outer diameter portion 34 which extends axially beyond the remainder of the primary seal 16 and which radially overlies the secondary seal 17. An axially projecting groove 35 is formed at the junction of the radially extending wall 36 and the portion 34. The radially extending wall 36 may be a straight radial wall or may be axially tapered as illustrated in FIG. 1.

The secondary seal 17 is substantially J-shaped having a short leg 38, a rounded bight portion 39 and a long leg 40. The long leg 40 terminates in a bead 41 which is dimensioned to be received in the axial groove 35. The long leg 40 preferably projects at an angle from the bead 41 which, in the embodiment of FIG. 1, is equal to the angle of the axially extending radial face 36 of the primary seal 16. In this manner, the secondary seal backs against the primary seal.

The inner diameter 42 of the primary seal 16 is spaced from the outer diameter face 43 of the inner diameter wall 23 of the housing 15. The secondary seal 17 is dimensioned so as to extend radially below the inner diameter 42 of the primary seal 16 and into contact with the face 43 of the housing. The garter spring 20 is received between the legs 38 and 40 of the secondary seal and contacts the rounded bight portion 39 thereof, thereby constricting the seal into spring-urged engagement with the face 43.

The ferrule 18 consists of a main ring portion 50 which is spaced axially behind the primary seal member 16 and which has projecting therefrom an axially extending leg 51 which abuts the secondary seal member in the area of the bead 41 and which overlies the bight portion thereof. A radially projecting shoulder portion 52 extends to a point where it radially overlies the axial end of the portion 34 of the primary seal. The wave spring 19 is received between the ferrule and the backwall 24 of the housing. The compressive spring force of the wave spring 19 acts on the ferrule 18 to urge the leg 51 against the secondary seal 17 to retain it in position in the groove 35 of the primary seal member 16. The spring force is transmitted through the secondary seal member to the primary seal member to urge the latter axially out of the open end 25 of the housing, thereby retaining it in sealing contact with the increased diameter portion of the shaft at the interface 13.

In this manner, the entirety of the seal assembly with the exception of the housing 15 is axially movable thereby assuring sealing at the interface 13 irrespective of short axial movement of the shaft 11. Further, the axially extending spring force generated by the wave spring 19 acts to take up wear on the carbon nose 32 of the primary seal member generated at the interface 13.

Preferably, the secondary seal member 17 is constructed of Teflon (Registered Trademark of E.I. du Pont de Nemours & Co. for polytetrafluoroethylene). Teflon is a relatively nonelastic material having cold-flow properties especially when subjected to extreme temperature ranges. For this reason, the garter spring 20 is employed to overcome the disadvantages otherwise inherent in the use of such material and acts to keep the secondary seal member in sealing engagement with the face 43 of the inner diameter wall 23 at the interface 14 irrespective of the temperatures encountered by the seal assembly. The constrictive force of the garter spring 20 is chosen so as not to prevent axial movement of the assembly in the housing.

The outer diameter of the primary seal member 16 is spaced from the outer diameter wall 22 of the housing 15 thereby allowing pressure retained by the seal assembly to flow through the opened end 25 of the housing radially beyond the nose portion 32. The pressure thereby fills the housing axially behind the primary seal member and secondary seal members. The pressure acts against both primary and secondary seal members to aid them in sealing at their respective interfaces. The pressure acts to force the primary seal member axially out the open end 25 of the housing inasmuch as the radial surface area of the end 33 of the primary seal member 16 is greater than the radial surface area at the opposite end due to the configuration of the nose 32 and its sealing contact with the increased diameter portion 12 of the shaft. Additionally, the pressure acts on the secondary seal member to urge it into tighter contact with the primary seal member and into greater sealing engagement at the interface 14. Therefore the sealing ability of the seal assembly increases as the pressure to be retained by the seal increases. The action of the secondary seal member against both the face 43 of the housing and the back of the primary seal member provides complete axial direction sealing through the housing preventing pressure flow around the primary seal member. The seal illustrated in FIG. 1 is adapted to seal against pressure encountered at the open end and outer diameter of the housing 11.

FIGS. 2 and 3 illustrate another embodiment of the seal of this invention which is particularly adapted to seal pressure from the inner diameter of the seal assembly as opposed to the embodiment of FIG. 1 which seals pressure from the outer diameter thereof. In this embodiment, the radial backwall 55 of the primary seal member 16b has two steps 56 and 57 which provide circumferential areas for receiving the secondary seal member 17b. The secondary seal member 17b has an outer diameter axial extending ring portion 58 which is integral at one end thereof with a first radially extending leg portion 59 which projects at substantially a right angle from the ring portion 58 and which in turn is integral with a second radially extending ring portion 60 which projects from the portion 59 radially and axially at an angle thereto in the direction of the primary seal member 16b. The second radial leg portion 60 is integral with the bight portion 61 which in turn is integral with the short leg portion 62.

The radially outermost step 56 provides an axially extending radial outer ring 64 on the primary seal member 16b which terminates in a radial wall 65 at the step 56. The axial ring member 58 of the secondary seal member 17b abuts the inner diameter of the portion 64 and a radial wall of the first radial leg portion 59 abuts the radial wall 65. Preferably, the first radial leg portion 59 has a radial length equal to the radial wall 65 of the step 56.

The axial end 70 of the axial ring member 58 remote from the first radial leg portion 59 of the secondary seal member is tapered and mates with a tapered face 71 on the ferrule 72. Inasmuch as the ferrule 72 is pressed in an axial direction by the wave spring 19, the mating tapered faces 70 and 71 urge the axial portion 58 of the secondary seal member 17b into tight sealing engagement with both the radial wall 65 of the step 56 and the inner diameter of the axially extending portion 64 of the primary seal member 16b. Therefore, it can be seen that complete sealing is obtained around the secondary seal member, first because of the seal interface 14b between the bight portion 61 and the inner diameter wall of the housing which are retained in contact by the action of the garter spring 20 and second, by the sealing fit relationship between the first radial leg portion 59 and the axial ring member 58 of the secondary seal member 17 and the respective surfaces of the primary seal member against which they abut under the influence of the wave spring force transmitted thereto through the mutually tapered faces 70 and 71.

The modification illustrated in FIG. 2 is particularly adapted to seal against pressures from the inner diameter of the housing, that is, pressures originating from the sealed area behind the closed end of the U-shaped cross section housing. Such pressures are then entrapped radially below the primary seal member 16b and act against the secondary seal member 17b from the direction of the short leg 62 thereof. Such pressures will then act to force the secondary seal member into tighter circumferential sealing engagement at the interface 14b in the same manner as the pressures act against the secondary seal 17 to increase the seal at the interface 14 in the embodiment of FIG. 1. Further the pressure will act against the long leg of the secondary seal forcing it in the direction of the ferrule 72 to increase the bidirectional force on the axial ring member 58 caused by the mating tapered faces 70 and 71. This increased pressure will enhance the sealing relationship between the axial ring member 58 and the primary seal member preventing a pressure leakage at that point.

This embodiment is also adapted to act as an efficient seal in embodiments where the pressure to be retained may originate from either end of the seal housing or may reciprocate from one end to the other thereof. It can be seen that if the pressure originates from the same end of the housing as in the embodiment in FIG. 1, that is from the open end of the housing, it will act upon the primary seal member 16b in substantially the same manner. However, it will also act to enhance the sealing of the secondary seal member in that it will add to the wave spring pressure against the ferrule 72 urging it in an axial direction where it encounters the tapered axial end 70 of the ring member 58 of the secondary seal member 17b thereby increasing the sealing pressure at both the radial wall 65 of the step 56 and the inner diameter of the axially extending portion 64 of the primary seal member 16b.

In addition to the semirigidity of the Teflon material and the provision of a fulcrum point at the intersection of the axial steps 56 and 57, the secondary seal member will remain in contact at the interface 14b due to the provision of the garter spring 20.

FIG. 3 illustrates an embodiment similar to FIG. 2 which is equally adapted for use in direction-changing sealing embodiments and which is further adapted for high-pressure sealing where the pressure is to be retained at the inner diameter or behind the closed end of the U-shaped cross section housing. FIG. 3 illustrates the seal in such an environment.

The secondary seal 17c of the embodiment illustrated in FIG. 3 includes an outer diameter axially extending ring portion 58b which is integral at one end thereof with a radially extending leg portion 75 which is in turn integral with the bight portion 76. The bight portion 76 is integral with the short leg portion 77. A tapered axial end face 70b on the outer diameter axially extending ring portion 58b mates with the tapered face 71b of the ferrule 72 as in the embodiment in FIG. 2. The primary seal member 16b, the ferrule 72, the wave spring 19 and the garter spring 20 are all the same as in the embodiment in FIG. 2. When the pressure to be retained by the seal originates from the outer diameter thereof or from the open end of the U-shaped cross section housing, it can be seen that the pressure will cooperate with the wave spring and ferrule to entrap the portion 58b and the radially outer portion of the radial leg 75 of the secondary seal between the ferrule and the primary seal member 16b. In addition, the cooperating tapered faces 70b and 71b will act to seal the interface between the ring 58b and the portion 64 of the primary seal and the radially outermost portion of the radial leg 75 and the face 65 as in the embodiment in FIG. 2. Further, due to the entrapment of the radial leg 75 between the ferrule 72 and the face 65, the secondary seal will be retained in sealing engagement at the interface 14c. This sealing engagement is aided by the garter spring 20. Because of the action of the pressure on the ferrule 72 and the resultant increase in sealing strength due to the effect of the force of the ferrule against the secondary seal member 17c, it can be seen that the pressure retained is used to increase the sealing power of the assembly.

When the assembly is subjected to very high pressures from the inner diameter of the seal assembly or those pressures which originate from the back or closed end of the seal assembly, the assembly will seal as illustrated in FIG. 3. The presence of the high pressure will cause the backface 72b of the outer diameter ring 72c of the ferrule 72 to bottom against the backwall 24 of the housing while at the same time pressing the secondary seal against the front radial wall 78 of the ferrule. In this manner, the tapering face 70b of the secondary seal is forced against the cooperating tapered face 71b of the ferrule to continue the seal at the interface between the ring portion 58b and the portion 64 of the primary seal member 16b. Additionally, the pressure contained will act to increase the force with which the bight portion 76 of the secondary seal 17c is urged against the inner diameter wall 23 of the housing at the interface 14c. Additionally, the presence of the high pressure will force the primary seal member 16b out of the open end 25 of the housing, thereby retaining it in sealing contact with the increased diameter portion of the shaft. It can be seen that the axially extending portion 64 of the primary seal 16b cooperates with the axially extending outer diameter portion 72c of the ferrule 72 in providing a minimal overlap when the ferrule is bottomed on the backwall of the housing and when the sealing nose 32 is in sealing engagement with the increased diameter portion of the shaft. Therefore, the portion 58b of the secondary seal 17c continues to engage the inner diameter face of the portion 64 of the primary seal member while allowing a degree of axial movement on the part of the primary seal member in response to axial movement of the shaft.

The embodiment illustrated in FIG. 4 is adapted to contain pressure applied from the outer diameter or open end of the seal assembly as in the embodiment illustrated in FIG. 1. A modified primary seal member 80 is illustrated having the carbon-sealing nose 81 retained in a retaining member 30 which has a stepped front end radial configuration 82 providing a right-angle groove for receiving the carbon nose seal 81. The back of the retaining member 30 has an axially extending outer diameter portion 83 which extends axially beyond the radial wall 84. A pure J-shaped secondary seal member 17d has its long leg 85 backed against the radial wall 84 and retained thereagainst by the action of the spring-urged ferrule 86. The ferrule 86 has an axially extending ring portion 87 integral on one end with the radially inwardly directed portion 88 and on the other end with the radially outwardly directed portion 89. The radially outwardly directed portion 89 has a radial wall 90 on its axial end. The outer diameter portion of the long leg 85 of the secondary seal 17d is entrapped between the radial wall 90 of the ferrule and the radial wall 85 of the retaining member 30. The axially rearmost portion 91 of the retaining member 30 is crimped over the radially outwardly directed portion 89 of the ferrule 86 to retain the ferrule and secondary seal 17d in position. This crimping also locks up the assembly. The radially inwardly directed portion 88 of the ferrule presents a radial wall against which the wave spring 19 acts to urge the entire assembly axially in the direction of the open end 25 of the housing. It can be seen that the retained pressure ill cooperate with the wave spring 19 to urge the carbon-sealing nose 81 into engagement with the increased diameter portion of the shaft. Further, the retained pressure will again encounter the secondary seal 17b on its short leg side and aid the garter spring 20 in retaining the bight portion of the secondary seal in sealing engagement with the inner diameter wall of the housing.

It can therefore be seen from the above that my invention provides for a novel shaft seal having primary and secondary seals wherein the secondary seal is comprised of a substantially J-shaped Teflon ring which is adapted to be urged into sealing engagement with the inner diameter wall of the seal housing while the primary seal member is urged into sealing engagement with an increased diameter portion of the shaft, the primary and secondary seals being axially movable within the housing and the seal force being increased in response to increased sealed pressures.

I claim:

1. A shaft seal assembly comprising: a substantially U-shaped cross section ring housing having a backwall connecting inner and outer diameter walls, a primary seal member received in said housing having a portion thereof adapted to project from the open end of the housing into sealing engagement with a shaft-carried abutment, an axially extending circumferential wall on said primary seal member within housing, said axially extending wall adjacent a radially extending circumferential wall on said primary seal member within said housing, a substantially J-shaped cross section secondary seal ring within said housing, said secondary seal ring having a substantially radially extending long leg, an axially extending flange at the outer diameter of said long leg, the outer diameter of said flange in circumferential engagement with the said axial wall, a first axial end of said flange normally in circumferential engagement with said radial wall, a second axial end of said flange having an angled radially and axially extending face, a ferrule in said housing having a portion thereof radially inward of a portion of said axial wall, said portion of said ferrule having an angled radially and axially extending face adapted to mate with the angled face of said flange, spring means urging said ferrule in an axial direction towards said flange, said angled faces effective to urge said flange outward against said axial wall and to normally urge said first axial end of said flange against said radial wall whereby a sealing interface is maintained between said primary and said secondary seals, said secondary seal having portions thereof in circumferential sealing engagement with the inner diameter wall of said housing, and said primary and secondary seal members axially movable within said housing while maintaining the sealing relationship with one another and with the inner diameter wall of the said housing, said primary and secondary seal members movable independently of one another in the housing, the said ferrule having an axial extension extending away from the open end of the said U-shaped cross section housing, the said axial extension of the ferrule dimensioned to bottom against the backwall of the U-shaped cross section housing with the said angled face remaining radially inwardly of the said axially extending wall of the said primary seal member during normal operating conditions of the said seal assembly whereby the said flange of the said secondary seal is retained radially inwardly of the said axial wall of the said primary seal.